US006303213B1

(12) United States Patent
Berneth et al.

(10) Patent No.: US 6,303,213 B1
(45) Date of Patent: Oct. 16, 2001

(54) SUBSTRATES SECURE AGAINST UNAUTHORIZED COPYING AND THEIR PRODUCTION

(75) Inventors: Horst Berneth; Uwe Claussen; Rolf Richter; Harro Träubel, all of Leverkusen; Günter Franke, Leichlingen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/537,374

(22) Filed: Mar. 29, 2000

(30) Foreign Application Priority Data

Apr. 1, 1999 (DE) ............................................ 199 14 880
Feb. 7, 2000 (DE) ............................................ 100 05 276

(51) Int. Cl.[7] ............................... B32B 3/00; B42D 15/00

(52) U.S. Cl. ............................ 428/207; 428/29; 428/199; 428/211; 428/916; 283/72; 283/902

(58) Field of Search ......................... 106/31.77; 428/198, 428/29, 199, 207, 211, 916; 283/72, 902

(56) References Cited

U.S. PATENT DOCUMENTS 4,865,937 9/1989 Santilli et al. ....................... 430/137
5,425,978 6/1995 Berneth et al. ...................... 428/195

FOREIGN PATENT DOCUMENTS 263446 4/1988 (EP) .

OTHER PUBLICATIONS

Colour Physics for Industry, Roderick McDonald, ed., Society of Dyers and Colourists, (month unavailable) 1987, pp. 152–169.

*Primary Examiner*—Cathy Lam
(74) *Attorney, Agent, or Firm*—Joseph C. Gil; Richard E. L. Henderson

(57) ABSTRACT

The invention relates to substrates bearing visible information that is secure against unauthorized copying obtained by applying information in the form of combinations of at least one emitting colorant and at least one reflecting colorant that are selected to exhibit similar or identical hues when viewed, with no cognizance being taken of fluorescence, and are applied in such a manner that their color fields touch, wherein the color loci of the two colorants correspond to one of the trichromatic colors yellow, magenta, or cyan and the reflecting colorant is an organic or inorganic pigment.

8 Claims, No Drawings

SUBSTRATES SECURE AGAINST UNAUTHORIZED COPYING AND THEIR PRODUCTION

The invention relates to substrates secure against unauthorized copying and processes for their production.

There is a long-felt need for effective security against unauthorized copying. The literature contains a whole series of different proposals. Most of them are based on colouring the background of the original in order that the contrast may be reduced. Since the human eye and the sensor in the machine have different sensitivities for lightness values of colours, it has been attempted to darken the background during copying to a relatively larger extent for the sensor than for the eye. Not only reflecting dyes, in particular reds, but also fluorescent dyes have been mentioned for this purpose.

The introduction of colour copiers has further aggravated the problem. colours provide rapidly discernible information and are therefore widely used for marking, identifying, coding of articles, etc. A particular problem is the counterfeiting of securities, identity cards or the like by means of colour copies.

This problem is solved in DE-A-4,236,143 by a colorant combination of an emitting and a reflecting colorant whose hue is similar or identical in retroreflective light.

It was found that, surprisingly, a substrate whose two colorants correspond to one of the trichromatic colours yellow, magenta or cyan and are distinctly more stable to the action of light permits universal use.

The invention provides substrates bearing visible information applied thereto which are secure against unauthorized copying and to which the information was applied using a colorant combination of at least one emitting and at least one reflecting colorant such that their hues upon viewing with no cognizance being taken of fluorescence are similar or identical, in such a manner that the various colour fields touch, characterized in that the colour loci of the two colorants then correspond to one of the trichromatic colour yellow, magenta or cyan and the reflecting colorant is an organic or inorganic pigment.

The trichromatic colour in question are preferably yellow or magenta.

The reflecting colorant is again preferably an organic pigment.

The trichromatic colour are defined by the following parameters in the CIELAB system at medium depth of shade:

| | | nonfluorescent | fluorescent |
|---|---|---|---|
| Yellow: | L* | 80 to 90 | 95 to 105 |
| | a* | −10 to +10 | −01 to −25 |
| | b* | 40 to 100 | 20 to 100 |
| Magenta | L* | 45 to 60 | 70 to 90 |
| | a* | 40 to 70 | 45 to 90 |
| | b* | −10 to −30 | −10 to −25 |
| Cyan | L* | 45 to 60 | |
| | a* | −20 to −40 | |
| | b* | −30 to −50 | |

Preferably, the b* value in the Lab system of the yellow emitting colorant is 20 to 100, that of a magenta-coloured emitting colorant is −30 to −10 and that of a cyan-coloured emitting colorant is −50 to −30.

Particularly preferably, the b* values of the emitting colorant differ by less than 10 units from the b* value of the reflecting colorant.

The substrate according to the invention preferably includes pairs of colourants whose colour locus in the context of the above-recited CIELAB ranges comes very close to one of the standard printing colour yellow or magenta under DIN 16539. Particularly preferably the substrate includes colorant pairs where the absorption band of the fluorescent colorant is with no cognizance being taken of fluorescence virtually completely identical to the absorption band of a standard printing colour (yellow, magenta) and the reflecting colorant corresponds to such a standard printing colour. Preferably their absorption maxima in the reflectance spectrum are not more than 30 nm apart, especially not more than 20 nm apart. Preference is given to colorant pairs whose full width at half maximum value, i.e. the spectral width of the longest-wavelength band at half maximum absorbance (E/2 at $\lambda_{max}$), in the reflectance spectrum is <150 nm, preferably <100 nm. In the case of soluble fluorescent dyes, the full width at half maximum value of the absorption spectrum in solution can be applied.

Methods for measuring reflectance spectra are generally known, for example from colour Physics for Industry, Roderick McDonald, ed., Society of Dyers and colourists, 1987, especially pages 152–169. Similarly the measurement of reflectance spectra of fluorescent colorants is known and permits for example not only the measurement of the reflectance inclusive of the emission due to fluorescence but also the pure reflectance with elimination of the contributions due to fluorescence (pages 152–169). It is this last method of measurement which is meant when the colour loci and reflectance curves of the colorant pair are compared “with no cognizance being taken of fluorescence”.

Such colorant combinations are independent of the type of copying machine in their colour effect. They are also independent of the type of copying process.

The substrate according to the invention preferably further includes colorant pairs whose lightfastness is ideally identical, preferably differing by less than one point on the 8-point wool scale according to DIN 54004. Useful colorant combinations are in particular colorant combinations which do not change their shade, or change their shade in similar manner, on illumination. Preferably the lightfastness of the two colorants is at least 2, especially at least 3, on the 8-point wool scale according to DIN 54004.

Useful pigments include all colour pigments, preferably organic colour pigments.

Preferred reflecting colorants are:

C.I. Pigment Yellow 12, Pigment Yellow 13, Pigment Yellow 14, Pigment Yellow 17, Pigment Yellow 74, Pigment Yellow 150, Pigment Red 2, Pigment Red 48:2, Pigment Red 57, 57: 1, Pigment Red 122, Pigment Violet 19 and Pigment Violet 23.

Preference is likewise given to pigments obtained from cationic or anionic reflecting dyes by precipitation as insoluble lakes of these dyes with appropriate counterions, for example calcium, barium (in the case of anionic dyes) or molybdatophosphate, tungstenatophosphate, molybdatosilicate, tungstenatosilicate or the anions of organic carboxylic and sulphonic acids (in the case of cationic dyes). Useful dyes for this purpose include for example C.I. Basic Yellow 29, Basic Yellow 99 and Basic Red 46.

Examples of preferred emitting colorants are:

C.I. Direct Yellow 131, Disperse Yellow 36, Disperse Yellow 58, Disperse Yellow 82, Disperse Yellow 199, Disperse Yellow 202, Solvent Yellow 98, Basic Yellow 40, Acid Yellow 184, Acid Yellow 215, 215:1, Acid Yellow 226, Acid Yellow 227, Acid Red 50, Acid Red 52, Acid Red 189, Disperse Red 227, Disperse Red 303, C.I. 45 160, C.I. 45 175, C.I. 45 170, C.I. 73 300, and also polymer powders or polymer dispersions coloured with these dyes, for example polymer powders or polymer dispersions based on polyacrylonitrile, polyacrylate, polymethacrylate, polystyrene or their copolymers with each other or with other polymerizable monomers such as, for example, butadiene, maleic anhydride, methallylsulphonic acid, styrenesulphonic acid, acrylamidopropanesulphonic acid, etc., polyesters, polyamide, polycarbonate, epoxy resins, melamine-formaldehyde resins, polyurethanes, polyureas, styrene-acrylates, and also lakes of these dyes with appropriate counterions, for example calcium, barium (in the case of anionic dyes) or molybdatophosphate, tungstenatophosphate, molybdatosilicate, tungstenatosilicate or the anions of organic carboxylic and sulphonic acids (in the case of cationic dyes).

The reflectance colorant may be composed of a plurality of colorants, making it possible to exactly conform the hue to the reflectance spectrum without fluorescence of the emissive partner.

Similarly, the fluorescence colorant may consist of mixtures which are preferably made up in such a way that no absorption occurs within the emission band.

In a substrate according to the invention, a pattern fabricated from a colorant combination according to the invention, if visible in the original, appears as a monochrome spot in the copy. For this a plurality of colorant combinations may be used simultaneously in order that complex colour patterns may be produced.

The invention further provides a process for producing substrates bearing visible information applied thereto which are secure against unauthorized copying and to which the information was applied using a colorant combination of at least one emitting and at least one reflecting colorant such that their hue upon viewing with no cognizance being taken of fluorescence are similar or identical, and at the same time the colour loci of the two colorants correspond to one of the trichromatic colours yellow, magenta or cyan and the reflecting colorant is an organic or inorganic pigment, characterized in that the information is applied in such a manner by means of the colorant combination that the various colour fields touch.

Colorant pairs useful in the process according to the invention have already been described above.

The process according to the invention may be carried out for example in various techniques. These include intaglio printing, flexographic printing, offset printing, gravure printing, screen printing, ink-jet printing, thermal transfer printing, electrophotography, etc. However, it is also possible for colour and/or printed films to be applied to the substrate, for example by adhering.

One possible way of the invention consists for example in printing paper with the emitting and the reflecting colorant in the form of a pattern in which the areas printed with the various colorants should touch. The printing ink includes for example the colorants as colour pigments (reflecting and/or emitting colorants) or as dye-pigmented plastics powders or polymer dispersions (emitting colorant) in binders customary for printing inks.

Examples of useful plastics powders are polyacrylonitrile, polyesters, polycarbonate, epoxy resin, melamine-formaldehyde resins; examples of useful dispersions are styrene-acrylates, polyurethanes or polyureas.

Instead of paper it is similarly possible to print other materials, for example nonwovens, polymeric films or platelets.

As well as the colorants according to the invention, the substrates may also include other colorants, for example in printed form, in order that the desired design may be conferred on the substrate to be secured.

After printing, the substrates may be coated with a transparent film or a lacquer. These may include for example UV absorbers or other light stabilizers. The photostability of the colorants may be enhanced in this way.

The substrate according to the invention is secure in all paper techniques for generating colour copies of originals. These are for example electrophotography (colour copiers), photography, lithography via corresponding colour separations (print preparation), digital electronic scanning, for example based on CCD, possibly followed by electronic data processing and any desired printing process (laser printers or LED printers based on photoconductive drums, ink-jet printers, thermal transfer, diffusion or sublimation printers, AgX printers.

If the scope for varying possible hues in the present invention is to be increased, it is further possible to modify the colorant combination for example by adding a reflecting colorant selected from the group consisting of magenta and cyan to the emitting as well as to the reflecting colorant component of the colorant combination.

The invention therefore further provides substrates bearing visible information applied thereto which are secure against unauthorized copying and to which the information was applied using a colorant combination of at least one emitting and at least one reflecting colorant such that their hues upon viewing with no cognizance being taken of fluorescence are similar or identical, in such a manner that the various colour fields touch, characterized in that the two colorants whose colour loci correspond to the trichromatic colour yellow, the reflecting colorant being an organic or inorganic pigment, have added to them a reflecting colorant whose colour locus corresponds to the trichromatic colour magenta or cyan.

The added colorant is preferably a colorant of the trichromatic colour cyan.

The reflecting colorant to be added is preferably likewise an inorganic or organic pigment, especially an organic pigment.

The emitting colorant of this aspect of the invention is preferably a mixture of a fluorescent yellow and a nonfluorescent magenta or cyan. The reflecting colorant of this aspect of the invention is preferably a mixture of a nonfluorescent yellow and a nonfluorescent magenta or cyan.

The substrate according to the invention particularly preferably includes colorant pairs where the absorption band of the yellow fluorescent colorant component prior to addition of the reflecting colorant is with no cognizance being taken of fluorescence ideally completely identical to the absorption band of the standard printing colour yellow and the yellow component of the reflecting colorant mixture corresponds to the yellow standard printing colour. The magenta and cyan components of the emitting and reflecting colorant mixtures each preferably correspond to the magenta-colour and the cyan-colour standard printing colour respectively and are nonemitting.

The emitting and reflecting colorant mixtures preferably include the same amount of the magenta or cyan component.

The colorant combination of the trichromatic colour yellow is otherwise subject to the preferred ranges indicated above.

Particular preference is given to a colorant combination of this embodiment of the invention which is characterized in that the emitting and the reflecting colorant are each a mixture of a colorant of the trichromatic colour yellow and of the trichromatic colour magenta in a mixing weight ratio of 300:1 to 50:1, preferably 200:1 to 100:1.

Preference is likewise given to a colorant combination of this embodiment of the invention which is characterized in that the emitting and the reflecting colorant are each a mixture of a colorant of the trichromatic colour yellow and of the trichromatic colour cyan in a mixing weight ratio of 300:1 to 2:1, preferably 100:1 to 10:1.

The abovementioned mixing ratios are to be understood as applying in the case of identical or approximately identical colour strengths for the components emitting yellow, reflecting yellow and reflecting magenta or emitting, yellow, reflecting yellow and reflecting cyan. The ratios must be appropriately converted in the case of colour strength differences.

If, for example, the emitting yellow component is only half as strong in colour as the reflecting yellow component, then the emitting colorant mixture is subject to mixing ratios of for example emitting yellow to reflecting cyan of 600:1 to 4:1, preferably 200:1 to 20:1, subject to the proviso that the cyan component is approximately as strong in colour as the reflecting yellow component. The same logic applies when the colour strengths of the yellow and cyan components differ. Such adaptations are necessary in particular when it is not pure colorants but preparations which are used.

Such preparations are for example dispersions of colorants in suitable use media, for example oils, resins, binders, water, solvents or mixtures thereof.

The preferred reflecting colorants to be added are the reflecting cyan and magenta colorants already mentioned above.

In a substrate according to the invention, a pattern fabricated from one of the above colorant combinations according to the invention, if visible in the original, appears as a monochrome spot in the copy. For this a plurality of colorant combinations can be used simultaneously in order that complex colour patterns may be produced.

A particular embodiment of the invention further provides a process for producing substrates bearing visible information applied thereto and secure against unauthorized copying, which is characterized in that the two colorants whose colour loci correspond to the trichromatic colour yellow, the reflecting colorant being an organic or inorganic pigment, have added to them a reflecting colorant whose colour locus corresponds to the trichromatic colour magenta or cyan.

Colorant pairs useful in the process according to the invention are those already described above. Similarly, production and use corresponds essentially to the above description.

EXAMPLES

Example 1

Two offset printing plates were produced in known manner, one bearing the word "ORIGINAL" as positive, the other as negative. An offset printing press was then used to print the word "ORIGINAL" onto paper by means of the first printing plate using a printing ink produced from 900 g of the pigment preparation BO-115 "Lemon Yellow"® from Sinloihi, Tokyo, Japan, a polymer powder coloured with a fluorescent dye and 100 g of linseed oil. In a second printing process, the second printing plate was used together with the printing ink Novavit HKS 3N® "Yellow" from K & E (Karst & Eichinger) Stuttgart to print a rectangular field around the word "ORIGINAL", so that there was finally a rectangular yellow area which contained the word "ORIGINAL" in fluorescent yellow without gap. This word was readily visible and legible to the human eye.

This print was copied on a colour copier. The copy showed a yellow rectangle in which the word "ORIGINAL" was no longer visible, since it had been reproduced in the same hue as the surrounding rectangle.

The original print and the copy have the following calorimetric data:

| | | L* | a* | b* |
|---|---|---|---|---|
| Original print | "ORIGINAL" | 97.4 | −20.7 | 96.0 |
| | Rectangle | 85.6 | 3.4 | 94.2 |
| Copy | "ORIGINAL" | 86.4 | −6.9 | 76.2 |
| | Rectangle | 86.3 | −6.9 | 76.5 |

Example 2

Example 1 was repeated, except that the word "ORIGINAL" was printed using a printing ink produced from 900 g of the pigment preparation BO-117 "Pink"® from Sinloihi, Tokyo, Japan, a polymer powder colour with a fluorescent dye and 100 g of linseed oil. The surrounding rectangle was printed with the printing ink Novavit® HKS 27K "Magenta" from K & E (Karst & Eichinger) Stuttgart. This finally produced a rectangular magenta-colour area which contained the word "ORIGINAL" in fluorescent red without gap. This word was readily visible and legible to the human eye.

This print was copied on a colour copier. The copy showed a magenta-colour rectangle in which the word "ORIGINAL" was no longer visible, since it had been reproduced in the same hue as the surrounding rectangle.

On reading the print with a scanner and printing it out via an inkjet printer, this likewise produced a magenta-colour rectangle in which the word "ORIGINAL" was no longer visible, since it had been reproduced in the same hue as the surrounding rectangle.

The original print, the copy and the inkjet printout have the following calorimetric data:

| | | L* | a* | b* |
|---|---|---|---|---|
| Original print | "ORIGINAL" | 61.6 | 85.7 | −10.3 |
| | Rectangle | 53.4 | 67.2 | −16.7 |
| Copy | "ORIGINAL" | 51.7 | 58.2 | −27.4 |
| | Rectangle | 51.6 | 55.3 | −20.0 |
| Inkjet printout | "ORIGINAL" | 49.1 | 51.2 | 2.2 |
| | Rectangle | 48.8 | 51.3 | 4.4 |

Example 3

Example 1 was repeated to produce in conventional manner two flexographic printing plates which again featured the word "ORIGINAL" once positively and once negatively.

The first printing plate was then used together with the aqueous pigment preparation SP-15 "Lemon Yellow"® from Sinloihi, Tokyo, Japan, a polyacrylic resin colour with a fluorescent dye, to print the word "ORIGINAL" onto paper. In a second printing process, the second printing plate was used together with the 1:10 water-diluted aqueous polymer dispersion of Pigment Yellow 74 (LEVANYL® Yellow 5GN-LF from Bayer AG, Leverkusen) to print a rectangular field around the word "ORIGINAL", to finally produce a rectangular yellow area which contained the word "ORIGINAL" in fluorescent yellow without gap. This word was readily visible and legible to the human eye.

This print was copied on a colour copier. The copy showed a yellow rectangle in which the word "ORIGINAL" was no longer visible, since it had been reproduced in the same hue as the surrounding rectangle.

Lightfastness: "ORIGINAL": 3

Rectangle: 4

The original print and the copy have the following colorimetric data:

| | | L* | a* | b* |
|---|---|---|---|---|
| Original print | "ORIGINAL" | 103.7 | −24.4 | 58.2 |
| | Rectangle | 85.8 | −2.1 | 43.1 |
| Copy | "ORIGINAL" | 83.3 | −9.0 | 45.2 |
| | Rectangle | 83.0 | −8.6 | 44.7 |

Example 4

Example 3 was repeated except that the word "ORIGINAL" was printed using the aqueous pigment preparation SP-17 "Pink"® from Sinloihi, Tokyo, Japan, a polyacrylic resin coloured with a fluorescent dye and diluted with 1.5 times the amount of water, and the rectangular environment was printed with the 1:10 water-diluted aqueous pigment dispersion of Pigment Red 122 (BAYSCRIPT® Magenta VP-SP 25012 from Bayer AG, Leverkusen).

Lightfastness: "ORIGINAL": 2

Rectangle: 3

The original print and the copy have the following colorimetric data:

| | | L* | a* | b* |
|---|---|---|---|---|
| Original print | "ORIGINAL" | 74.5 | 83.1 | −22.7 |
| | Rectangle | 57.5 | 40.6 | −20.5 |
| Copy | "ORIGINAL" | 50.2 | 50.6 | −30.5 |
| | Rectangle | 50.3 | 48.2 | −28.7 |

Example 5

A colour printing cartridge for the inkjet printer Canon BJC 620 Fluorescent Ink® (containing C.I. Solvent Green 7) was emptied and cleaned. It was filled with a pigment dispersion of Pigment Yellow 74 (BAYSCRIPT® Yellow VP-SP 25013 from Bayer AG, Leverkusen). The inkjet printer was then used with the dedicated cartridge containing fluorescent yellow ink and the cartridge filled as described above to print a sheet of paper in such a way that the dedicated cartridge printed a fluorescent yellow rectangle which contained without gaps the word "ORIGINAL" printed in yellow with the pigment dispersion. This word was readily visible and readable to the human eye.

This print was copied on a colour copier. The copy showed a yellow rectangle in which the word "ORIGINAL" was no longer visible, since it had been reproduced in the same hue as the surrounding rectangle.

Example 6

Example 5 was repeated, except that a cartridge was filled with a pigment dispersion of Pigment Red 122 (BAYSCRIPT® Magenta VP-SP 25012 from Bayer AG, Leverkusen). The dedicated cartridge of fluorescent red (containing C.I. Acid Red 92) and this refilled cartridge were used to print a fluorescent red rectangle containing the word "ORIGINAL" in magenta colour. This word was readily visible and legible to the human eye.

This print was copied on a colour copier. The copy showed a magenta-colour rectangle in which the word "ORIGINAL" was no longer visible since it had been reproduced in the same hue as the surrounding rectangle.

Example 7

Two flexographic printing plates were produced in known manner, one bearing the word "ORIGINAL" as positive, the other as negative.

The first printing plate was then used together with a mixture of 10 parts of the aqueous pigment preparation SP-15 "Lemon Yellow"® from Sinloihi, Tokyo, Japan, a polyacrylic resin coloured with a fluorescent dye and 0.05 part of an aqueous pigment dispersion of Pigment Blue 15:3, LEVANYL® Blau G-LF from Bayer AG, Leverkusen, to print the word "ORIGINAL" onto paper. In a second printing process, the second printing plate was used together with an aqueous pigment dispersion prepared from 1 part of a pigment dispersion of Pigment Yellow 74, LEVANYL® Yellow 5GN-LF from Bayer AG, Leverkusen, 0.05 part of an aqueous pigment dispersion of Pigment Blue 15:3, LEVANYL® Blau G-LF from Bayer AG, Leverkusen, and 9 parts of water to print a rectangular field around the word "ORIGINAL" to finally produce a rectangular pale green area which contained the word "ORIGINAL" in fluorescent pale green without gap. This word was readily visible and legible to the human eye.

LEVANYL® Yellow 5GN-LF has a similar colour strength to LEVANYL® Blau G-LF, but at 10 times higher colour strength than SP-15 "Lemon Yellow".

This print was copied on a colour copier. The copy showed a pale green rectangle in which the word "ORIGINAL" was no longer visible, since it had been reproduced in the same hue as the surrounding rectangle.

The original print and the copy have the following calorimetric data:

| | | L* | a* | b* |
|---|---|---|---|---|
| Original print | "ORIGINAL" | 86.3 | −40.4 | 44.2 |
| | Rectangle | 71.0 | −21.1 | 29.2 |
| Copy | "ORIGINAL" | 70.6 | −24.6 | 31.8 |
| | Rectangle | 70.7 | −25.3 | 28.0 |

Example 8

Example 7 was repeated except that the two mixtures of aqueous pigment dispersions, instead of 0.05 part, contained only 0.1 part of the aqueous pigment dispersion of Pigment Blue 15:3, LEVANYL® Blau G-LF from Bayer AG, Leverkusen.

This gave a rectangular green area containing the word "ORIGINAL" in fluorescent green. This word was readily visible and legible to the human eye.

This print was copied on a colour copier. The copy showed a green rectangle in which the word “ORIGINAL” was no longer visible, since it had been reproduced in the same hue as the surrounding rectangle.

The original print and the copy have the following calorimetric data:

| | | L* | a* | b* |
|---|---|---|---|---|
| Original print | “ORIGINAL” | 78.8 | −44.8 | 38.3 |
| | Rectangle | 66.2 | −23.3 | 21.7 |
| Copy | “ORIGINAL” | 62.6 | −30.5 | 25.0 |
| | Rectangle | 67.1 | −27.8 | 19.6 |

Example 9

Example 7 was repeated, except that the following two mixtures of aqueous pigment dispersions were used:

For the word “ORIGINAL”: Mixture of 10 parts of the aqueous pigment preparation SP-15 “Lemon Yellow” from Sinloihi, Tokyo, Japan, a polyacrylic resin coloured with a fluorescent dye and 0.01 part of an aqueous pigment dispersion of Pigment Red 122, BAYSCRIPT® Magenta VP-SP 25012 from Bayer AG, Leverkusen.

For the surrounding rectangle: Mixture of 1 part of a pigment dispersion of Pigment Yellow 74, LEVANYL® Yellow 5GN-LF from Bayer AG, Leverkusen, 0.01 part of an aqueous pigment dispersion of Pigment Red 122, BAYSCRIPT® Magenta VP-SP 25012 from Bayer AG, Leverkusen, and 9 parts of water.

This gave a rectangular yellowish orange area which contained the word “ORIGINAL” in fluorescent yellowish orange. This word was readily visible and legible to the human eye.

LEVANYL® Yellow 5GN-LF is 10 times as high as SP-15 “Lemon Yellow” and 1.5 times as strong in colour as BAYSCRIPT® Magenta VP-SP 25012.

This print was copied on a colour copier. The copy showed a yellowish orange rectangle in which the word “ORIGINAL” was no longer visible, since it had been reproduced in the same hue as the surrounding rectangle.

The original print and the copy have the following colorimetric data:

| | | L* | a* | b* |
|---|---|---|---|---|
| Original print | “ORIGINAL” | 99.5 | −18.2 | 54.8 |
| | Rectangle | 83.4 | 1.5 | 39.9 |

-continued

| | | L* | a* | b* |
|---|---|---|---|---|
| Copy | “ORIGINAL” | 84.4 | −9.9 | 44.7 |
| | Rectangle | 84.4 | −9.7 | 43.1 |

What is claimed is:

1. A substrate bearing visible information that is secure against unauthorized copying obtained by a process comprising applying to the substrate information in the form of combinations of at least one emitting colorant and at least one reflecting colorant that are selected to exhibit similar or identical hues when viewed, with no cognizance being taken of fluorescence, and that are applied in such a manner that their color fields touch, wherein two of the colorants are emitting and reflecting colorants having color loci corresponding to a trichromatic color that is yellow and are mixed with a reflecting colorant having a colour locus corresponding to a trichromatic color that is magenta or cyan, the reflecting colorants being organic or inorganic pigments.

2. A substrate bearing visible information that is secure against unauthorized copying obtained by a process comprising applying to the substrate information in the form of combinations of at least one emitting colorant and at least one reflecting colorant that are selected to exhibit similar or identical hues when viewed, with no cognizance being taken of fluorescence, and that are applied in such a manner that color fields of the colorants touch, wherein the colorants have colour loci corresponding to trichromatic colors selected from yellow, magenta, and cyan and the reflecting colorant is an organic or inorganic pigment.

3. A substrate according to claim 2 wherein the colour loci of the colorants correspond to one of the trichromatic colours yellow or magenta.

4. A substrate according to claim 2 wherein the reflecting colorant is an organic pigment.

5. A substrate according to claim 2 wherein a yellow emitting colorant having a b* value in the CIELAB system of 20 to 100, a magenta-coloured emitting colorant having a b* value of −30 to −10, and a cyan-coloured emitting colorant having a b* value of −50 to −30 are used.

6. A substrate according to claim 2 wherein the colorants exhibit light-fastness values that are not more than one point apart on the 8-point wool scale.

7. A substrate according to claim 2 wherein the colorants have absorption maxima that do not differ by more than 30 nm.

8. A substrate according to claim 2 wherein the colorants have absorption bands for which the full width at half maximum value is less than 150 nm.

* * * * *

UNITED STATES PATENT AND TRADEMARK OFFICE

CERTIFICATE OF CORRECTION

PATENT NO. : 6,303,213 B1
DATED : October 16, 2001
INVENTOR(S) : Horst Berneth et al.

It is certified that error appears in the above-identified patent and that said Letters Patent is hereby corrected as shown below:

Column 1,
Line 18, delete "colours" and insert -- Colours --.
Line 38, delete "colour" should appear as -- colours --.
Line 41, delete "colour" should read as -- colours --.
Line 53, delete
"a* -10 to + 10 -01 to –25"
and insert
-- a* -10 to + 10 -10 to –25 --.

Column 2,
Line 4, delete "colour" and insert -- colours --.
Line 21, delete "colour" and insert -- Colour --.
Line 50, delete "57: 1" and insert -- 57:1 --.

Column 3,
Line 53, delete "One possible way of the invention consists for example in" and insert -- One possible way of practising the invention consists for example in --.

Column 4,
Line 10, delete "colour" and insert -- coloured --.
Line 58, delete "magenta-colour and the cyan-colour standard printing" and insert -- magenta-coloured and the cyan-coloured standard printing --.
Line 59, delete "colour" and insert -- colours --.

Column 5,
Line 13, delete "emitting," and insert -- emitting --.

Column 6,
Line 8, delete "calo-" and insert -- colo- --.
Lines 25, 29, 34, 38 and 63, delete "colour" and insert -- coloured --.
Line 43, delete "calorimetric" and insert -- colorimetric --.

Column 8,
Line 45, delete "calo-" and insert -- colo- --.

UNITED STATES PATENT AND TRADEMARK OFFICE

CERTIFICATE OF CORRECTION

PATENT NO. : 6,303,213 B1

DATED : October 16, 2001

INVENTOR(S) : Horst Berneth et al.

It is certified that error appears in the above-identified patent and that said Letters Patent is hereby corrected as shown below:

Column 9,

Line 5, delete "calo-" and insert -- colo- --.

Signed and Sealed this

Eleventh Day of March, 2003

JAMES E. ROGAN

*Director of the United States Patent and Trademark Office*